United States Patent [19]

Boatwright

[11] Patent Number: 4,956,836
[45] Date of Patent: Sep. 11, 1990

[54] AUTOMATIC BYPASS SYSTEM FOR RING TYPE LOCAL AREA NETWORK

[75] Inventor: Darrell L. Boatwright, Cedar Rapids, Iowa

[73] Assignee: PAR Microsystems Corp., New Hartford, N.Y.

[21] Appl. No.: 173,824

[22] Filed: Mar. 28, 1988

[51] Int. Cl.⁵ .............................................. H04J 1/16
[52] U.S. Cl. ................................. 370/16.1; 340/827
[58] Field of Search .................... 372/14, 15, 16, 13, 372/16.1; 379/273; 340/827

[56] References Cited
U.S. PATENT DOCUMENTS 4,623,884 11/1986 Ihara et al. ........................ 370/86
4,680,750 7/1987 Davidow ........................... 370/16

Primary Examiner—Joseph A. Orsino
Assistant Examiner—Frank M. Scutch, III
Attorney, Agent, or Firm—Charles S. McGuire

[57] ABSTRACT

In an exemplary embodiment, a ring net work is of a multiple petal configuration with the petal path to and from each node extending through a petal isolator at a hub location. A set of terminals is provided at the hub location for each node. An activity detector is coupled to a terminal of each set for detecting the normal network signals returning from a respective node, and a bypass controller is connected to another terminal of each set for sensing such signals transmitted to a respective node. The controller operates to sense separate signal bursts, and to bypass the set of terminals associated with a give node in the absence of signal detection by the associated signal detector after a selected number of separate signal bursts have been transmitted to the node. The timing relationships can be adjusted to accommodate a ring network where signals are transmitted about a ring with signal amplification and undelayed signal transmission at the respective nodes.

8 Claims, 5 Drawing Sheets

AUTOMATIC BYPASS SYSTEM FOR RING TYPE LOCAL AREA NETWORK

INCORPORATION BY REFERENCE

The present disclosure particularly relates to improvements on a system and method for communication between modes of a closed loop local communication path as described in George E. Chadima, Jr., et al, U.S. Pat. No. 4,723,208 issued Feb. 2, 1988. Said U.S. Pat. No. 4,723,208 is assigned to the present assignee, and the written disclosure and drawings thereof are hereby incorporated herein by reference.

BACKGROUND OF THE INVENTION

In Local Area Networks (LAN) of a ring architecture there is a major problem of how to handle network failures that open the ring and stop communications. In a commercially successful ring network of the present assignee, the loop communication path of the ring network is of a multiple petal configuration, with the path to and from each node extending through a central "petal isolator" at which each node can be bypassed manually in the event of a failure. It is conceived that significant improvements are possible in automating such a petal isolator system, particularly in avoiding any need for the transmission and reception of special test signals at the central petal isolator location.

SUMMARY OF THE INVENTION

It is therefore an object of the present invention to provide a petal type ring network with a novel automatically operating petal isolator system for automatically detecting failure of a petal type transmission path or segment thereof without requiring transmission and reception of extraneous test signals via the ring network.

In a particular preferred embodiment applicable to the system of the aforesaid incorporated patents, input signals leading to a node input, e.g., normal data signals, may traverse a central petal isolator location and then travel toward the node; such input signals are monitored (preferably at the isolator location) by a system which has a timing criterion coordinated with the propagation delay of a signal transmission path from the monitoring location to the node and back to the isolator location, and also preferably coordinated so as to accommodate particular operating conditions such as may occur during bidding contention in the ring network of the aforementioned incorporated patents. Output signals from a node output, e.g., normal data signals transmitted by the node, are monitored at an activity detection means. If activity is detected in conformity with the time criteria of the system, it is concluded that the petal path including the node is functioning properly. Otherwise a node bypass signal is automatically generated, e.g., for reconfiguring the network to exclude the petal transmission path section deemed to be defective.

Various objects, features and advantages of the invention will be apparent from the following detailed description taken in connection with the accompanying drawings, and from the individual features of the appended claims.

DETAILED DESCRIPTION

Figure 1:
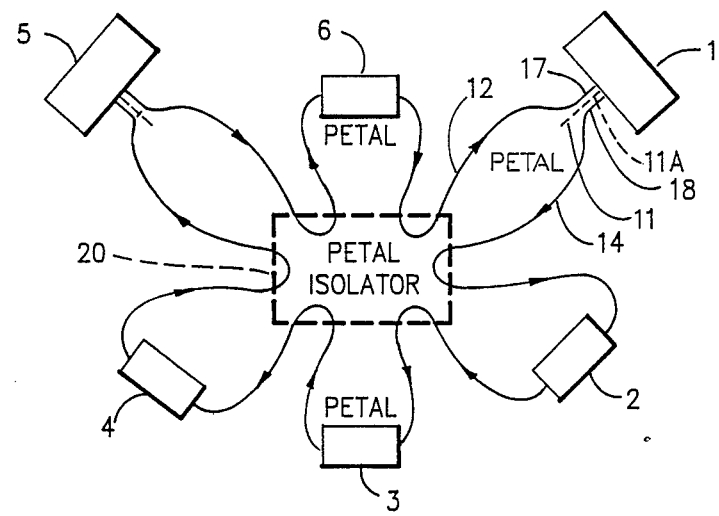
FIG. 1 is a diagrammatic illustration of a closed loop communication network (which may incorporate the automatic bypass system of FIGS. 2, and 3A-3D)

In a commercial ring type local area network as generally indicated in U.S. Pat. No. 4,604,693, a series of nodes such as 1, FIG. 1, are arranged along a ring communications path. Each node includes a transmission link switch such as diagrammatically indicated at 11. Each link switch such as 11 is operated between a closed, non-transmitting condition as indicated in FIG. 1, and an open, transmitting condition, by means of a coupling from the nodes such as indicated at 11A. Additional node systems are indicated at 2 through 6, each of which includes a respective transmission link switch corresponding to switch 11. In the commercial system, the nodes each connect with a central hub region (a so-called "petal isolator") as indicated at 20. Reference may be made to the U.S. Pat. No. 4,604,693 for details of the protocol utilized by way of example with the network configuration such as shown in FIG. 1. In general as to each node, such as node 1, data signals are transmitted from the central location 20 via an outgoing network path such 12 and reach the node 1 via a local signal receiving path such as indicated at 17. With the transmission link switch 11 in the illustrated blocking or cutoff position, the data signal arriving via node signal receiving path 17 may simply be stored at node 1 and not transmitted to node signal sending path 18. On the other hand, if the transmission link switch is in the transmitting position, the signal arriving via network outgoing line 12 will not only be transmitted via node signal receiving path 17 to node 1, but also will be transmitted without any processing step delay directly to the network return path 14 which returns to hub region 20. Thus, with the transmission link switch 11 in transmitting condition, the node 1 in effect monitors the transmission along the ring, but does not introduce any store and forward type processing step delay between paths 12 and 14.

In the exemplary protocol utilized in the system of FIG. 1, each node with a signal to transmit monitors the ring path for a "communications gap" of a specified time duration. When such a communications gap is observed at a node with a message to transmit, that node will shift its transmission link switch into the open cutoff condition and transmit a bid message from the node, e.g., via the node signal sending path 18 for the case of node 1. If only node 1 desires to transmit, all of the other transmission link switches will be in transmitting condition, and the bid message from node 1 will traverse the ring path and return via path sections 12 and 17 to the node 1. Node 1 will then recognize that its bid has succeeded and will proceed to transmit its desired message without allowing a communications gap (at any of the other nodes) of the specified duration. When node 1 receives a first portion of a response to its transmitted message, node I will switch its transmission link switch to the transmitting condition prior to reception of a further portion of such response, thereby avoiding a communications gap at certain nodes. After receiving the response to its transmitted message completely, node 1 will switch its transmission link switch to cutoff mode, and thereafter the responding node will switch to transmitting mode. For the example of successful bidding and message transmission from node 1, the other nodes upon receipt of the bid would insure that their link switches were in transmitting mode. The particular node to which the message was directed after receiving the message would switch its link switch to cutoff mode, send a response, and after a time delay shift the link switch to transmitting mode.

Figure 2:
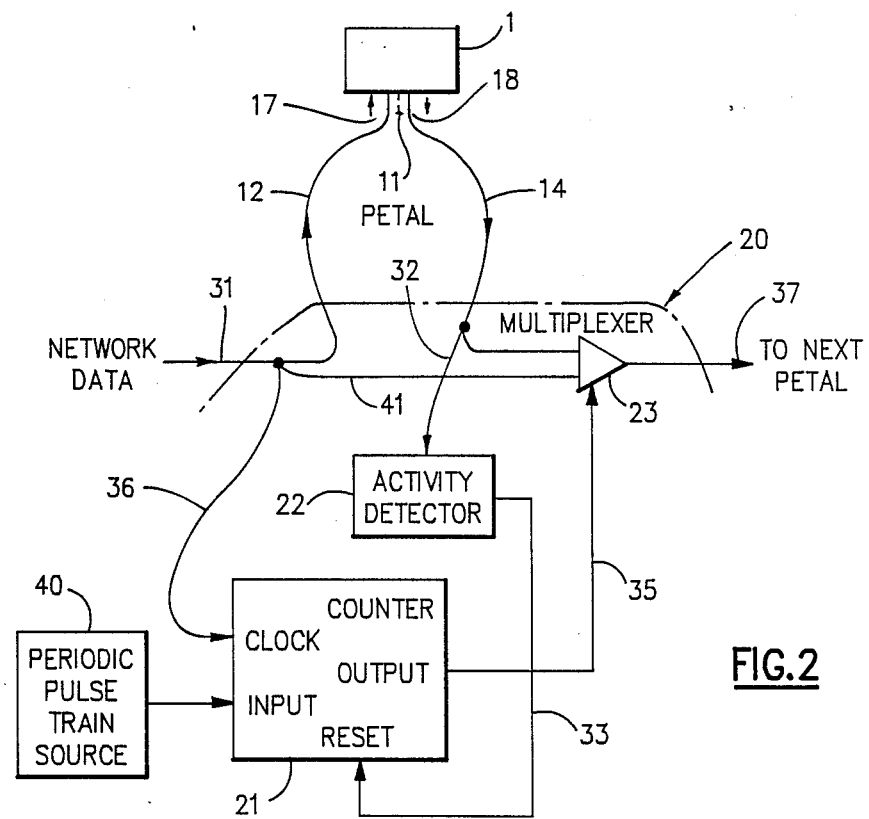
FIG. 2 is a block diagram for showing a preferred form of node automatic bypass system in accordance with the present invention.

Description of FIG. 2.

FIG. 2 is a diagrammatic illustration of an embodiment in accordance with the present invention. For the sake of ease of correlation, the illustrated components in FIG. 2 have been shown as associated with node 1 of FIG. 1, and the associated reference numerals 11, 11A, 12, 14, 17 and 18 have also been utilized in FIG. 2. In FIG. 2 the link switch 11 is shown (diagrammatically) in its transmitting mode, while in FIG. 1 it is shown in its cutoff mode. The nodes 2 through 6 would have link switches with corresponding transmitting and cutoff modes and would have components such as 21, 22 and 23 associated therewith within the central "petal isolator" or hub region 20, FIG. 1.

In the exemplary embodiment of FIG. 1, network traffic of the ring network is bursty and asynchronous so there are times when the network is very busy and times where it is idle for long periods of time. It is to be assumed that when a petal comprised of network lines such 12, 14, FIG. 2, (with its associated node 1) fails, all traffic is blocked and nothing comes into the central hub region 20 from the petal (e.g., from line 14). When the petal is functioning, data comes into the hub region 20 via a network line 31, and e.g., traverse the node 1 via transmission link switch 11 in its transmitting mode, and returns via line 14. The data coming back via line 14 is tapped so as to be supplied to the activity detector 22. As indicated by line 33, the activity detector 22 serves to reset the counter 21. The system operates so that as long as the petal is passing data, the detector 22 resets the counter 21 in such a manner as to prevent an output signal being generated at the counter output 35. With the counter output 35 inactive, data is transmitted from network line 14 to network line 37 leading to the next petal.

If the petal of node 1 blocks data the activity detector 22 will not reset the counter 21, but the data coming into the petal at line 31 will allow the periodic pulse train from source 40 to be input to the counter 21 via line 36. If two positive going transitions of the periodical pulse train are clocked into the counter 21 by network data, then the output of the counter at 35 actuates multiplexer 23 and causes the petal to be bypassed. As represented by line 41, in the petal bypass state, multiplexer 23 transmits network data arriving via line 41 to the network line 37 leading to the next petal. Once the petal has been bypassed it will remain in that status until data activity from the petal (via line 14) is restored, thus resetting the counter 21 and allowing data traversing the pedal to pass to network line 37. If data flow stops due to idle time in the system, nothing happens since the counter 21 is not actuated in the absence of input network data at line 31. Thus, gaps in communication along the ring network are not interpreted as a petal failure.

A manual switch may be provided in the system of FIG. 2 to allow service personnel to force a petal out of service for maintenance work. For the illustrated embodiment, such a manual switch may override the logic state at line 35, for example. Visual indicators are used to represent the status of the bypass circuitry.

A unique feature of the illustrated embodiment is the use of the local area network data to gate a periodic pulse train into a counter (e.g., counter 21, FIG. 2). The timing relationship of the counter is readily selectable by selecting the frequency of the periodic pulse train source 40. The selected time interval takes account of the time required for transmission from a network line such as 31 of a preceding petal about the petal to a line such as 32. The timing relationship must also take account in the preferred example the various possible actions which may be taken at each node during bidding and response to bid messages and so on. For example, where node 1 must send its data message via line 14 within one millisecond of receipt of its bid message at line 12, the pulse train source 40 may transmit pulses at an interval of greater than one millisecond. Then if a first bid message produces a count of one in the counter 21, with link switch 11 in cutoff mode, the data message from node 1 at line 14 would be transmitted to activity detector 22 and reset counter 21 prior to generation of a further pulse from source 40, and counter 21 could not reach a count of two.

Where several nodes issue bids in quick succession, it is conceivable that more than one bid message would arrive at a given bidding node (where the node link switch was in cutoff mode). However, with pulses from source 40 being transmitted at one millisecond intervals, only one count could result at counter 21. If then the node with the lowest address sends out a further bid (U.S. Pat. No. 4,604,693, col. 10, lines 31–35 and lines 53–68), this bid will be detected by the activity detector associated with the node with lowest address to actuate the associated activity detector and reset the associated counter.

At a node of higher address which was unsuccessful in a bidding contention, the associated counter could have a count of one as a result of the unsuccessful bid, but the associated link switch would be closed, at the time of the new bid, and the new bid message would be expected to occur in less than one millisecond from the prior bidding, so that it could not also be counted by the counter. Further, the counter output could be triggered only at a count of three if desired, while the new bid message would reset the counter after traversing the link switch of such higher addressed node.

If bids from different nodes had such a timing that several nodes registered bid messages with higher addresses during a first bidding contention, the further bids would all be expected to follow in less than one millisecond so that no node would be expected to receive a bid message spaced by more than one millisecond from the first bidding, and each second bid message would actuate the associated activity detector to reset the associated counter in less than one millisecond. Again a counter setting of three for each node counter would further safeguard against false signals.

If bids from different nodes had such a timing that several nodes registered bid messages with higher addresses during a first bidding contention, the further bids would all be expected to follow in less than one millisecond so that no node would be expected to receive a bid message spaced by more than one millisecond from the first bidding, and each second bid message would actuate the associated activity detector to reset the associated counter in less than one millisecond. Again a counter setting of three for each node counter would further safeguard against false signals.

Description of FIGS. 3A-3D

FIGS. 3A-3D taken together show an exemplary bypass system for the case of three nodes arranged in a ring network. It is assumed for the sake of example, that a first or A node (e.g. corresponding to node 1, FIG. 2) supplies its data signals via a pair of conductors EXA LO and EXA HI shown at the upper left in FIG. 3A. An activity detection circuit 50A corresponding with activity detector 22, FIG. 2, is shown coupled with line EXA HI (which receives data signals returning from the A node) via a gate 51A. Similarly second and third nodes, i.e., the B and C nodes, may have normal data signals therefrom arriving at conductor pairs EXB HI, EXB LO (FIG. 3B), and EXC HI, EXC LO (FIG. 3C), and activity detection circuits 50B and 50C are shown coupled with lines EXB HI and EXC HI via respective gates 51B and 51C. Paths leading to the respective first, second and third nodes are designated ERA HI, ERA LO, ERB HI, ERB LO, and ERC HI, ERC LO. The respective conductor pairs from the A, B and C nodes are shown as leading from terminals J1-2, J1-3, FIG. 3A; J2-3, J2-4, FIG. 3B; and J4-2, J4-3, FIG. 3C; while the other conductor pairs may lead to terminals J1-6, J1-7, FIG. 3A; J3-3, J3-4, FIG. 3B; and J4-6, J4-7, FIG. 3C. The connectors J1 through J4 may form part of a petal isolator or hub region 60, corresponding to region 20, FIG. 2.

Counter circuits 70A, 70B and 70C corresponding with counter 21, FIG. 2, are shown coupled with conductors ERA HI, ERB HI and ERC HI. The reset lines corresponding to line 33, FIG. 2, are lines 71A, 71B and 71C.

Multiplex circuits 80A, 80B and 80C each correspond with a multiplex circuit such a 23, FIG. 2, and lines 81A, 81B and 81C may each correspond with a multiplex control line such as 35, FIG. 2. Thus if counter 70A detects a failure of the petal path such as 12, 14, FIG. 2, associated with a first node, counter 70A generates a signal $\overline{BYPASSA}$ at line 81A which blocks the A gate elements (111A and 112A) of multiplex 80B, while the C gate elements (111C and 112C) are enabled.

Figure 3A:
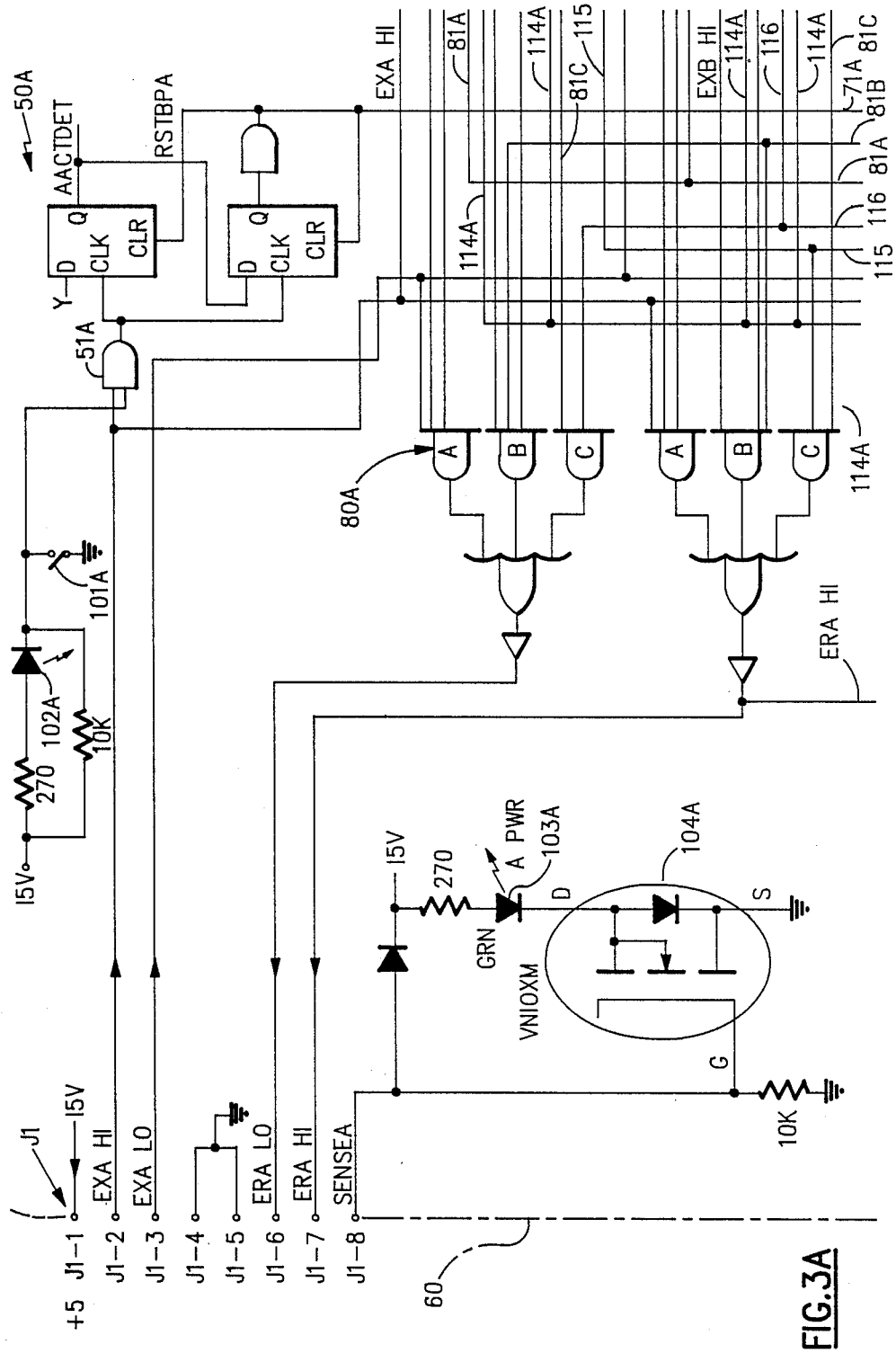
FIGS. 3A-3D show details of a specific implementation of the block diagram of FIG. 2.
Figure 3B:
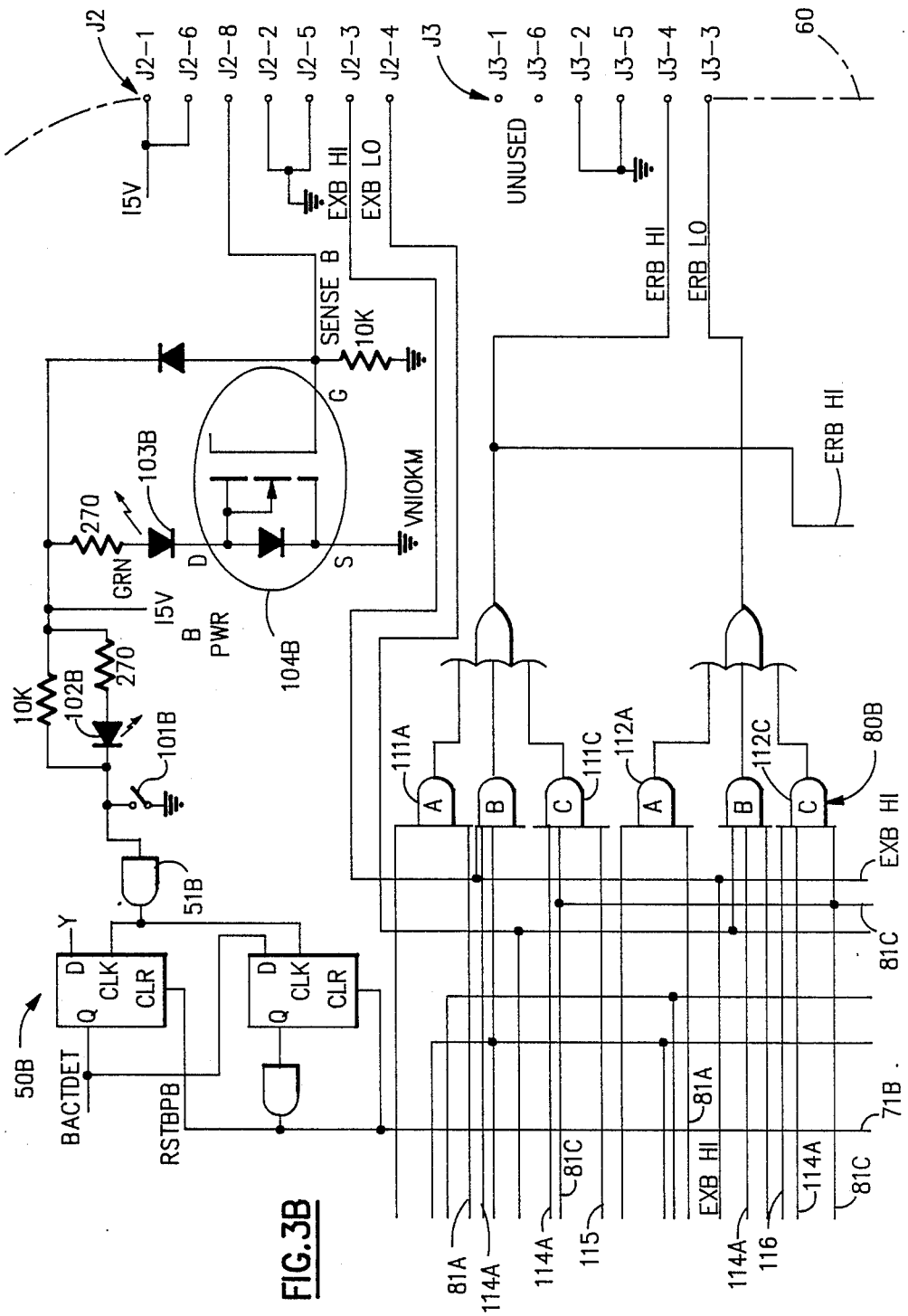

A periodic pulse train source 100, FIG. 3A, e.g. type LM555, may correspond with source 40, FIG. 2. Where all of the circuitry for a set of nodes is at a hub region 60 as in FIGS. 3A-3D, it is convenient to use a single source 100 for all of the counters such as 70A, 70B and 70C as is shown by source output line 101, FIG. 3C and 3D. Exemplary parameters for source 100 are C1, 0.1 microfarad; C2 and C3, 0.01 microfarad each; R1, 10.8 kilohms; and R2, adjustable zero to five kilohms. As previously explained, the frequency of the periodic pulse train, i.e., the pulse interval, is selected to assure that various possible signal sequences which may terminate at a given node cannot produce a false bypass output from the counters such as 70A, 70B, and 70C. A manual bypass switch may be associated with each of gates 51A, 51B and 51C, as indicated at 101A, 101B and 101C. Actuation of a bypass switch may be indicated by a respective red light emitting diode 102A, 102B, 102C. A green light emitting diode 103A, 103B, 103C may be associated with power supply terminals J1-1, J2-1 and J4-1 (which may receive plus five volts D.C. when the node circuits of hub region 60 are energized); and controlling transistors 104A, 104B, 104C may be connected to terminals J1-8, J2-8 and J4-8 which supply respective signals SENSE A, SENSE B and SENSE C when the respective individual A, B and C segments are receiving operating power.

In a present commercial system an eight conductor shielded data link (SDL) cable is used between each fiber optic interface and a respective set of terminals at the central hub (corresponding generally with terminals J1, J2, J3 and J4 herein). The plus five volt DC (+5 VDC) used to power the fiber optic interfaces is on pin one of the SDL connector. When the fiber optic module is connected to the end of this SDL cable, the plus five volts DC (+5 VDC) is routed back to the originating end of the cable to allow the central hub to sense that its terminal is connected to something. In the case of the auto bypass petal isolator of FIGS. 3A-3D, the plus five volts DC is connected to pin 8 of terminals J1, J2 and J4 so as to turn on visual indicators 103A, FIG. 3A; 103B, FIG. 3B; and 103C, FIG. 3C. In other possible cabling configurations which directly connect major components such as two consoles in series between a petal isolator input and output (to form further electrical segments of the ring network) the sense line can also provide power for the auto bypass petal isolator in the event that the petal isolator should lose its primary power from a main power source. This improves system survivability by having an alternative power source that comes "on line" as needed. The petal isolator concept may also be implemented in remotely located pieces of equipment.

When the respective bypass signals at 81A, 81B, 81C are true, respective yellow light emitting diodes 105A, 105B, 105C are energized, and respective input gates (110A, 110B, 110C) to the respective counters 70A, 70B, 70C are disabled to prevent further signals at the respective clock inputs (CLK) of the counters.

Operation of FIGS. 3A-3D

Figure 3C:
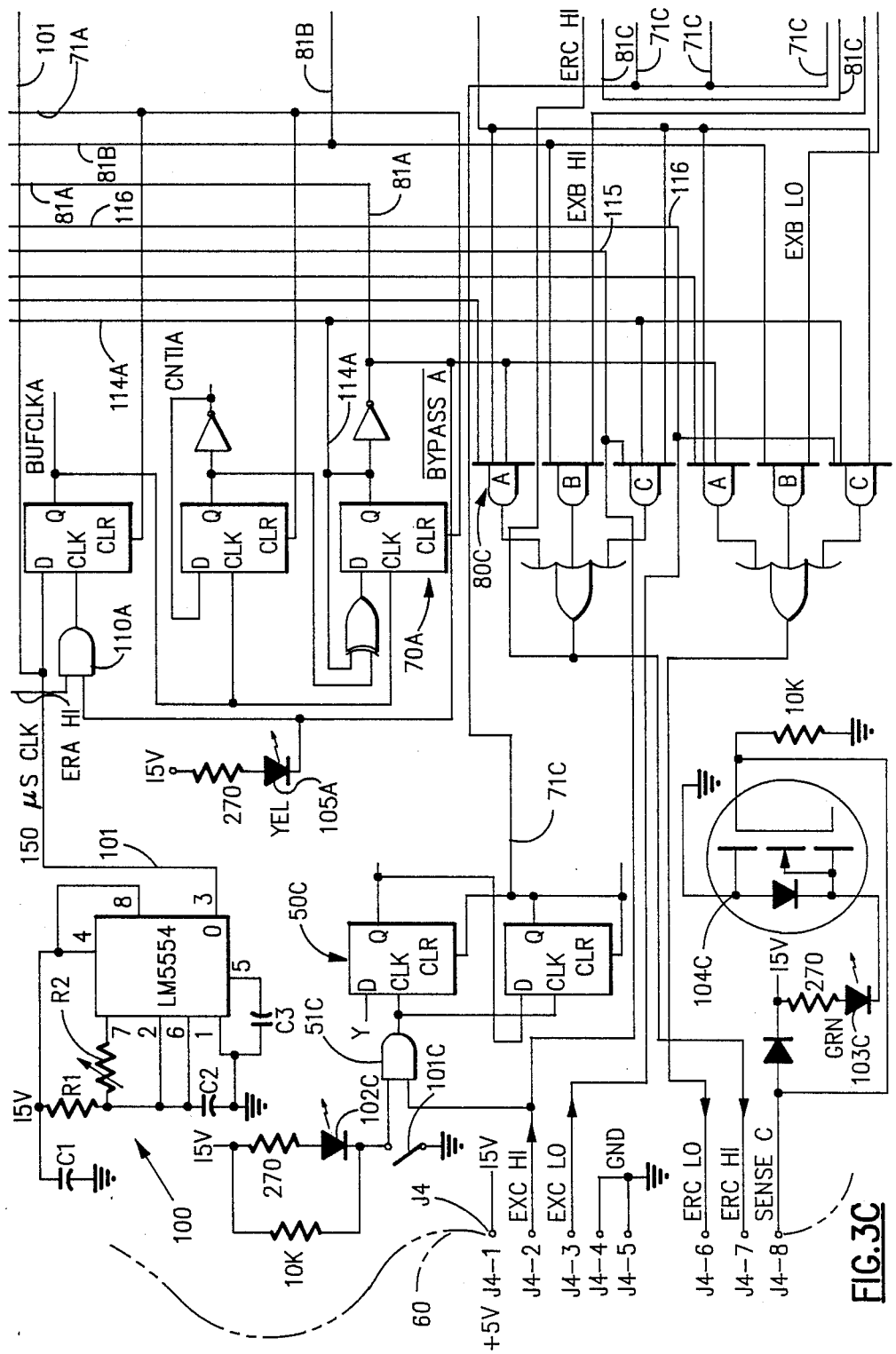

For the case where pulse source 100 provides a pulse interval of one millisecond, at a first trigger pulse from source 100, if a normal data signal is transmitted to line ERA HI, FIG. 3A, the counter 70A is actuated to a count of one. If the data signal is returned to terminal J1-2 as signal EXA HI in the normal manner (link switch at the first or A node, corresponding to switch 11, FIG. 2, in the transmitting mode and petal path corresponding to 12, 14 in tact), then prior to any further trigger pulse from source 100, activity detector 50A will be actuated to reset counter 70A via line 71A. If, however, there is a defect in the node petal path corresponding to 12, 14, FIG. 2, the counter 70A will not be reset by normal return data signal activity at activity detector 50A, in the time interval between the first and second trigger pulses from source 100, and the second (or further) trigger pulse which is transmitted as a result of data signal activity at line ERA HI will actuate counter 70A to a count value of two, producing a bypass signal at counter output 81A. Thereafter until counter 70A is reset, input gate 110A of counter 70A will block input signals to counter 70A, and multiplex gates 111A and 112A of multiplexer 80B, FIG. 3B, will block signals from lines EXA HI and EXA LO, while multiplex gates 111C and 112C of multiplexer 80B are enabled via the noninverted counter output at 114A. Accordingly signals at EXC HI and EXC LO, FIG. 3C, are transmitted via lines 115, 116 to gates 111C, 112C and thence to the B node via ERB HI and ERB LO, bypassing the A node.

When the petal path of the A node has been restored to operation, data signals from the A node at EXA HI will actuate activity detector 50A, automatically resetting counter 70A and removing the bypass condition from counter outputs 81A, 114A.

Operation is similar for disturbances of the petal paths of the B and C nodes, and will be readily understood from the foregoing description with respect to the A node.

The principles illustrated for the case of three nodes obviously may be extended to networks of greater complexity and may be applied also for non-centralized bypass systems.

Figure 3D:
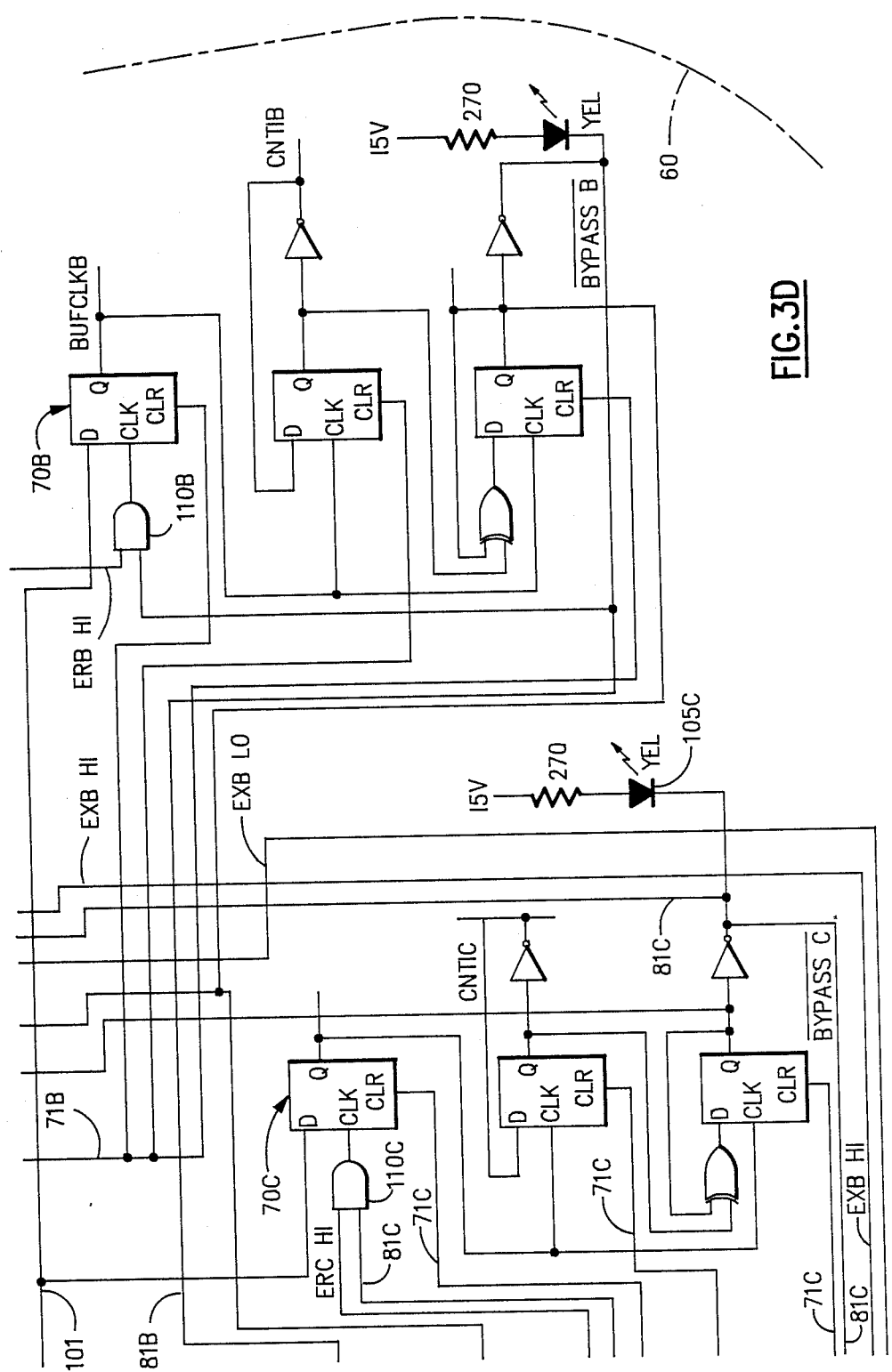

In the example of FIGS. 3A 3D, the counters 70A, 70B, 70C may require a count value of at least two, and further do not supply the bypass signal instantly in response to a given count value, e.g., two, but may incorporate a time delay e.g. at least 150 microseconds, corresponding to the inherent time delay for a data signal at terminal J1-7 to traverse a petal path and actuate activity detector 50A. Such time delay may be provided by requiring the counter to reach a further count value, e.g. a count of three before transmitting the bypass command signal at its output.

Where the counters 70A, 70B and 70C are formed of D type edge-triggered flip-flops, the duration of each high logic level trigger pulse from pulse source 100 may be less than the minimum pulse interval of data signals on lines such as ERA HI. The clocking of the D type flip flops can thus only occur once per pulse from the pulse source 100.

It will be apparent that many modifications and variations may be effected without departing from the scope of the teachings and concepts of the present invention.

I claim as my invention:

1. In a local area ring network wherein a plurality of signal transmitting and receiving nodes, each including a transmission link switch operable in either a transmitting or a blocking condition, each of said nodes being connected to the next in a continuous series by a signal-conducting path having first portions including an individual node and input and output lines connected thereto, and second portions through which each of said first portion output lines is connected to the next first portion input line, an automatically operable bypass system for isolating one of said first portions from the remainder of said signal-conducting path in response to a failure within said one first portion while maintaining the continuous series connection of all parts of said network other than said one first portion, said bypass system comprising:

(a) an activity detector (22) having an input connected (via 32) to said one node output line (14), and adapted to generate an output when signals are present on said one node output line;

(b) a signal-conducting bypass line (41) for conducting signals from the node preceding to the node succeeding said one node without passing through said one first portion;

(c) first means (23) operable in response to a control input to enable signals from either said bypass line or said one node output line to be transmitted to the input line (37) of said succeeding node; and (d) second means (21) connected to receive and detect inputs from both said activity detector output (via 33) and said one node input line (via 36), and operable to supply (via 35) said control input to said first means in response to absence of an input from said activity detector output when inputs from said one node input line are detected.

2. The bypass system of claim 1 wherein said first means comprises a multiplexer receiving signals from both said one node output line and said bypass line and a control input from said second means.

3. The bypass system of claim 1 wherein said signals are transmitted by said nodes in data bursts, and said second means is operable to supply said control signal to said first means in response to absence of an input from said activity detector after a predetermined number of separate data bursts from said one node input line are detected.

4. The bypass system of claim 3 wherein said predetermined number is at least two.

5. The bypass system of claim 4 wherein said second means comprises a counter.

6. The bypass system of claim 5 and further comprising a pulse train source (40) connected to an input of said counter.

7. The bypass system of claim 6 wherein said activity detector is connected to a reset input of said counter.

8. The bypass system of claim 7 wherein said one node input line is connected to a clock input of said counter.

* * * * *